United States Patent
Capillo Carril (10) Patent No.: US 11,269,821 B2
(45) Date of Patent: Mar. 8, 2022

(54) METHOD AND SYSTEM FOR GENERATING SCHEMAS

(71) Applicant: Oracle International Corporation, Redwood Shores, CA (US)

(72) Inventor: Esteban Alejandro Capillo Carril, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 288 days.

(21) Appl. No.: 15/945,109

(22) Filed: Apr. 4, 2018

(65) Prior Publication Data

US 2019/0311050 A1    Oct. 10, 2019

(51) Int. Cl.
    *G06F 16/21*    (2019.01)

(52) U.S. Cl.
    CPC ......... *G06F 16/213* (2019.01); *G06F 16/212* (2019.01)

(58) Field of Classification Search
    CPC .............................. G06F 16/213; G06F 16/212
    See application file for complete search history.

(56) References Cited

U.S. PATENT DOCUMENTS

| | | | |
|---|---|---|---|
| 9,864,816 B2 | 1/2018 | Liu et al. | |
| 2013/0198684 A1* | 8/2013 | Boley | G06F 16/2428 |
| | | | 715/788 |
| 2015/0356123 A1* | 12/2015 | Gorelik | G06F 16/213 |
| | | | 715/765 |
| 2016/0378792 A1* | 12/2016 | Rashid | G06F 16/211 |
| | | | 707/804 |
| 2017/0060894 A1* | 3/2017 | Gorelik | G06F 16/116 |
| 2017/0091622 A1* | 3/2017 | Taylor | G06F 17/18 |
| 2017/0206256 A1* | 7/2017 | Tsirogiannis | G06F 16/211 |

OTHER PUBLICATIONS

S'anchez-S'aez et. al, "Confidence Measures for Error Discrimination in an Interactive Predictive Parsing Framework", 2010 (Year: 2010).*

* cited by examiner

*Primary Examiner* — Aleksandr Kerzhner
*Assistant Examiner* — Anugeetha Kunjithapatham
(74) *Attorney, Agent, or Firm* — Trellis IP Law Group, PC (57) ABSTRACT

In implementations, a schema generation utility is configured to allow a user to abstract and generate a schema, such as a JSON schema, from a base schema instance according to schema configuration data, other data inputs, and schema configuration models. In an implementation, a user provides parameters, configuration objects, etc. for a desired final output schema. The schema generation utility may be configured to receive and parse the base schema instance into a plurality of configurable data objects, also referred to as "schema chunks," that are extracted from the base schema instance. A set of schema chunks may be assembled into a desired output schema based on, at least in part, configuration data and assembly data contained in the schema chunks. In other implementations, input parameters may include error tolerance thresholds processed by the schema generator to discern between errors that lead to schema failure and benign errors.

13 Claims, 10 Drawing Sheets

```
                        Json Schema
{
  "$annotation" : {
    "supermarket" : {
      "employee" : {
        "address" : {
          "number" : "100",
          "street" : "Oracle Parkway"
        },
        "area" : "Computer",
        "name" : "Gambardella, Matthew",
        "score" : null
      }
    }
  },
  "$schema" : "http://json-schema.org/draft-04/schema#",
  "definitions" : {
    "supermarket" : {
      "properties" : {
        "employee" : {
          "$ref" : "#/definitions/supermarket/employee"
        }
      },
      "type" : "object"
    },
```

FIG. 7A

```
"supermarket/employee" : {
  "properties" : {
    "address" : {
      "$ref" : "#/definitions/supermarket/employee/address"
    },
    "area" : {
      "type" : "string"
    },
    "name" : {
      "type" : "string"
    },
    "score" : {
      "type" : null
    }
  },
  "type" : "object"
},
"supermarket/employee/address" : {
  "properties" : {
    "number" : {
      "type" : "number"
    },
    "street" : {
      "type" : "string"
    }
  },
  "type" : "object"
}
},
"properties" : {
  "supermarket" : {
    "$ref" : "#/definitions/supermarket"
  }
},
"type" : "object"
}
```
— 214

METHOD AND SYSTEM FOR GENERATING SCHEMAS

BACKGROUND

The following relates to generating schemas, such as a JavaScript Object Notation (JSON) schema using base schemas, schema configuration data, and other data. More specifically the following relates to a utility configurable by a user, which is configured to generate a JSON schema from another instance of a JSON schema.

JSON schema may be considered a new technology relative to XML schema. As described by the JSON specification "JSON schema" version 4 (JSON-SCHEMA.ORG), herein incorporated by reference, a JSON schema is used to describe a JSON data format. As such, a JSON schema is considered a JSON type of media that is used to define the structure of JSON data. JSON schemas provide context for JSON data used with a particular application and how the JSON data interacts with the application. In short, a JSON schema is generally intended to be used for validating and documenting instances of JSON data, and providing hyperlink navigation and interaction control over JSON data.

Unfortunately, due to the nearly infinite number of schema combinations and permutations, there are currently no tools that effectively generate schemas, such as JSON schemas, to a desired configuration without utilizing separate schema design and development processes. Moreover, since predefined schemas are usually generated by a schema developer from scratch, such predefined schemas are not easily configurable or modifiable to tailor the output schema for a particular use once they have been designed as there configuration has been fixed at the design phase.

SUMMARY

In one implementation, a schema generation utility is configured to allow a user to abstract and generate a desired output schema, such as a JSON schema, from a base schema instance according to schema configuration input, other data inputs, and schema configuration models. In other implementation, a user inputs parameters, configuration objects, etc. for a desired output schema based on one or more base schema instances. The input parameters, configurations data, and base schema instances are then employed by a schema generator to generate the desired output schema.

The schema generation utility may be configured to parse the base schema instance into a plurality of data objects, also referred to herein as "schema chunks," that are extracted from the schema instance. The schema chunks may be configurable to allow a user to configure schema chunk values, value types, data, etc. Such configurable schema chunks may then be employed to configure and build the output schema according to a user's configuration input and input parameters. In some implementations, input parameters may include error tolerance thresholds processed by the schema generator in order to discern between errors that would lead to output schema failure and those that are considered benign.

In other implementations, a schema generator is employed to analyze one or more base schema instances, configuration input, output schema parameters, and other data to generate the output schema, and then use the base schema instance for validating the generated output schema. In some implementations, the schema generator is configured with a recursive error reduction process in order to generate the target schema, e.g., JSON schema, until errors are within an acceptable level and/or are flagged as benign or tolerable errors. As such, the schema generator may be configured to recursively resolve the errors to a predefined error acceptance level.

In exemplary implementations, a schema generator analyzes the efficiency of the processor and dynamically adjusts the schema generation based on the number of available processor threads in order to improve and/or establish desired processor efficiency during schema generation. For example, in some implementations, the schema generator may be configured to adjust the schema generation process to allow for more or less processor efficiency depending on a user establishing a desired schema processing rate and/or processing efficiency threshold.

In other implementations, when arrays are used as an input, the schema generator, or processes thereof, may be configured to select a first array element as the array type, or may be configured to do a pseudo random sample of the input array to determine if types of data in the array vary. If the data types vary, the schema generator may determine a course of action such as providing a data type variance flag to prompt the user to define the array and/or data type, repairing the array, establishing different array processing processes, etc.

A further understanding of the nature and the advantages of particular embodiments disclosed herein may be realized by reference of the remaining portions of the specification and the attached drawings.

DETAILED DESCRIPTION

Implementations herein provide a schema generation tool configured to abstract and generate a schema from a base schema instance according to user configuration input. In one implementation, a user inputs a base schema instance, parameters, configuration objects, etc. to generate a desired output schema model based on the base schema instance.

To form the output schema, the schema generation utility may be configured to parse the base schema instance into a plurality of data objects, also referred to herein as "schema chunks," that are extracted from the base schema instance. The schema chunks may be configurable. Sets of such "configurable schema chunks" may then be combined to build an output schema according to the input parameters and user configuration input pertaining to an output schema configuration. The output schema may then be validated against the base schema instance, using for example, a data object comparison process to validate schema chunks against corresponding data objects of the base schema instance.

In other embodiments, input parameters may include error tolerance thresholds processed by the schema generator in order to discern between errors that would lead to output schema failure, and those errors that are considered benign, which will not cause failure of the output schema when implemented, or errors that fall below one or more error tolerance thresholds.

Figure 1:
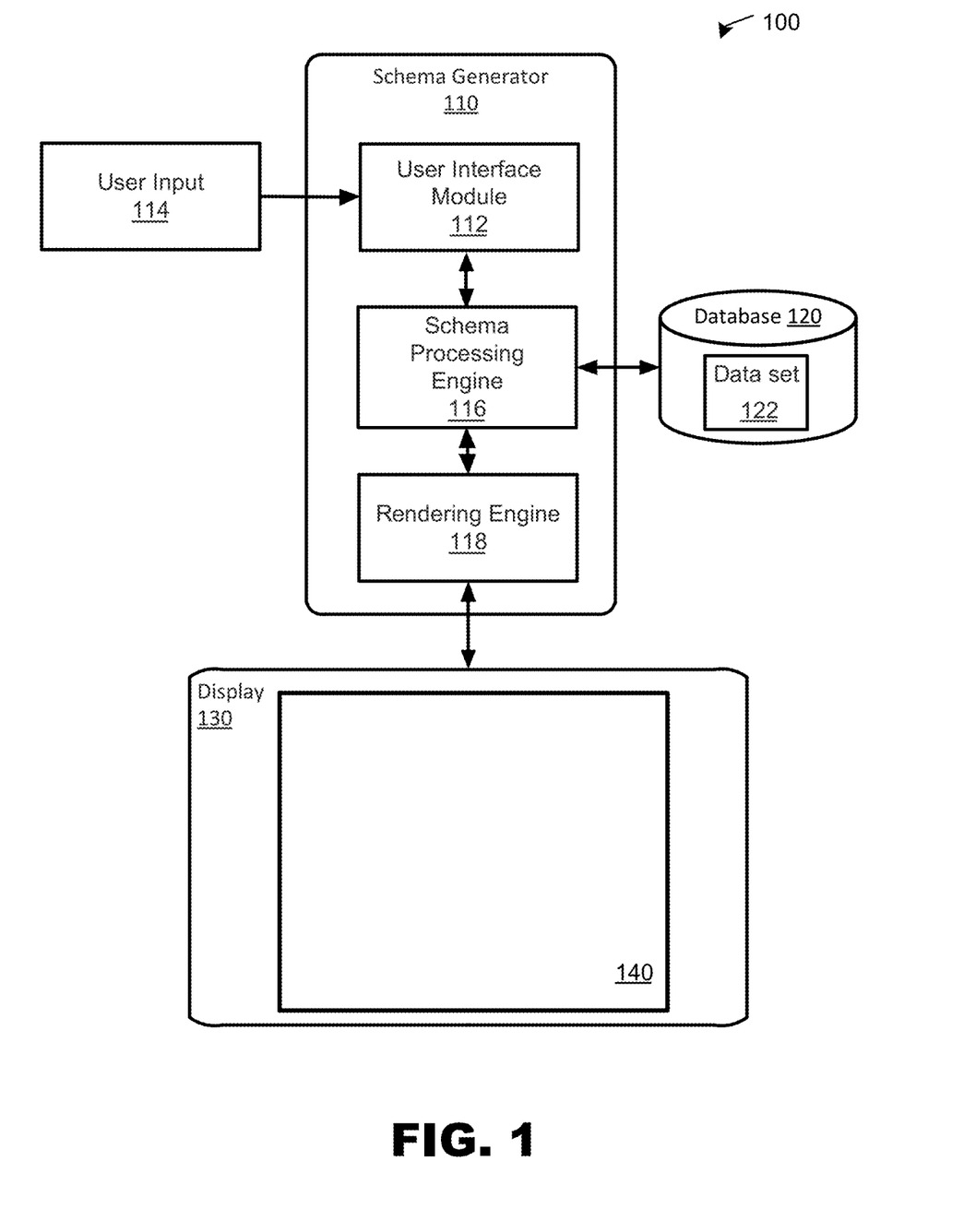
FIG. 1 is a high level illustration of a computing system used for generating schemas.

FIG. 1 is a high-level block diagram of an exemplary computing system 100 for generating schemas. Computing system 100 may be any computing system, such as an enterprise computing environment, client-server system, and the like. Computing system 100 includes schema generator 110 configured to process data received from a user interface 114, such as a keyboard, mouse, etc., with regard to processes such as generating, configuring, modeling, labeling, data binding, maintenance, etc., associated with data elements, information, and the like as described herein.

Note that the computing system 100 presents a particular example implementation, where computer code for implementing embodiments may be implemented, at least in part, on a server. However, embodiments are not limited thereto. For example, a client-side software application may implement schema generator 110, or portions thereof, in accordance with the present teachings without requiring communications between the client-side software application and a server.

In one exemplary implementation, schema generator 110 may be connected to display 130 configured to display data 140, for example, to a user thereof. Display 130 may be a passive or an active display, adapted to allow a user to view and interact with graphical data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to generate schemas, convert data, model, analyze, deploy schemas, maintain data 140, etc.

In some implementations, computing system 100 may include a data source such as database 120. Database 120 may be connected to the schema generator 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to schemas, data attributes, data models, data structures, data hierarchy, nodal positions, values, value types, summations, visualizations, algorithms, code (e.g., JSON, JavaScript, XSD, XML, etc.), source, security, hashes, and the like. In addition, data sets 122 may also contain other data, data elements, and information such as metadata, labels, development-time information, run-time information, user configuration information, API, interface component information, library information, error threshold data, pointers, and the like.

Schema generator 110 may include user interface module 112, schema transformation engine 116, and rendering engine 118. User interface module 112 may be configured to receive and process data signals and information received from user interface 114. For example, user interface module 112 may be adapted to receive and process data from user input associated with data 140 for processing via schema generator 110.

In exemplary implementations, schema processing engine 116 may be adapted to receive data from user interface 114 and/or database 120 for processing thereof. In one configuration, schema processing engine 116 is a software engine configured to receive and process input data, such as output schema parameters, etc., from a user thereof pertaining to data 140 from user interface module 114 and/or database 120 in order to generate an output schema from a base schema instance, such as a base JSON schema instance, and then validate the generated output schema relative to the base schema and error thresholds. For example, during the validation process, schema processing engine 116 may compare data objects in the output schema to data objects in the base schema.

Moreover, schema processing engine 116 may be used to determine whether errors in the output schema are within acceptable levels, where some conversion error thresholds may be set for benign errors and/or for other types of user and/or system acceptable errors, thereby providing for an adjustable schema generation tolerance.

For example, schema processing engine 116 may allow for schema generation with an acceptable threshold level of errors, such as errors of certain types, acceptable errors, reference errors, and the like. Schema processing engine 116 may also be used to correct and resolve such errors or on the fly, with or without warnings given to a user thereof, in a recursive manner, for example, by using techniques such as solving references, assigning target "QNames," specifying relative routes, etc.

Schema processing engine 116 in other implementations may be configured as a data analysis tool to perform analysis functions associated with data 140. Such analysis functions may include determining the attributes associated with data 140, determining the type of data, types of schemas, determining the values of the data, data types, determining the relationships to other data, interpreting metadata associated with the data, determining error types, tolerance data, and the like.

For example, schema processing engine 116 may be configured to receive and analyze data sets 122 to determine key/value pairs, string identifiers, data properties, types of errors, error tolerance levels, schema types, user interface configuration, definitions, data processing instructions, data attributes, data hierarchy, nodes, nodal positions within the hierarchy, values, data type, summations, algorithms, source, security, hashes, and the like, associated with data sets 122.

Schema processing engine 116 may receive existing data sets 122 from database 120 for processing thereof. Such data sets 122 may include and represent a composite of separate data sets 122 and data elements pertaining to, for example, organizational data, which may include data such as employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122 associated with data 140. In one implementation, upon receiving instruction from a user, for example, through user interface 114, rendering engine 118 may be configured to generate a real-time display of interactive changes being made to data 140 by a user thereof.

Figure 2:
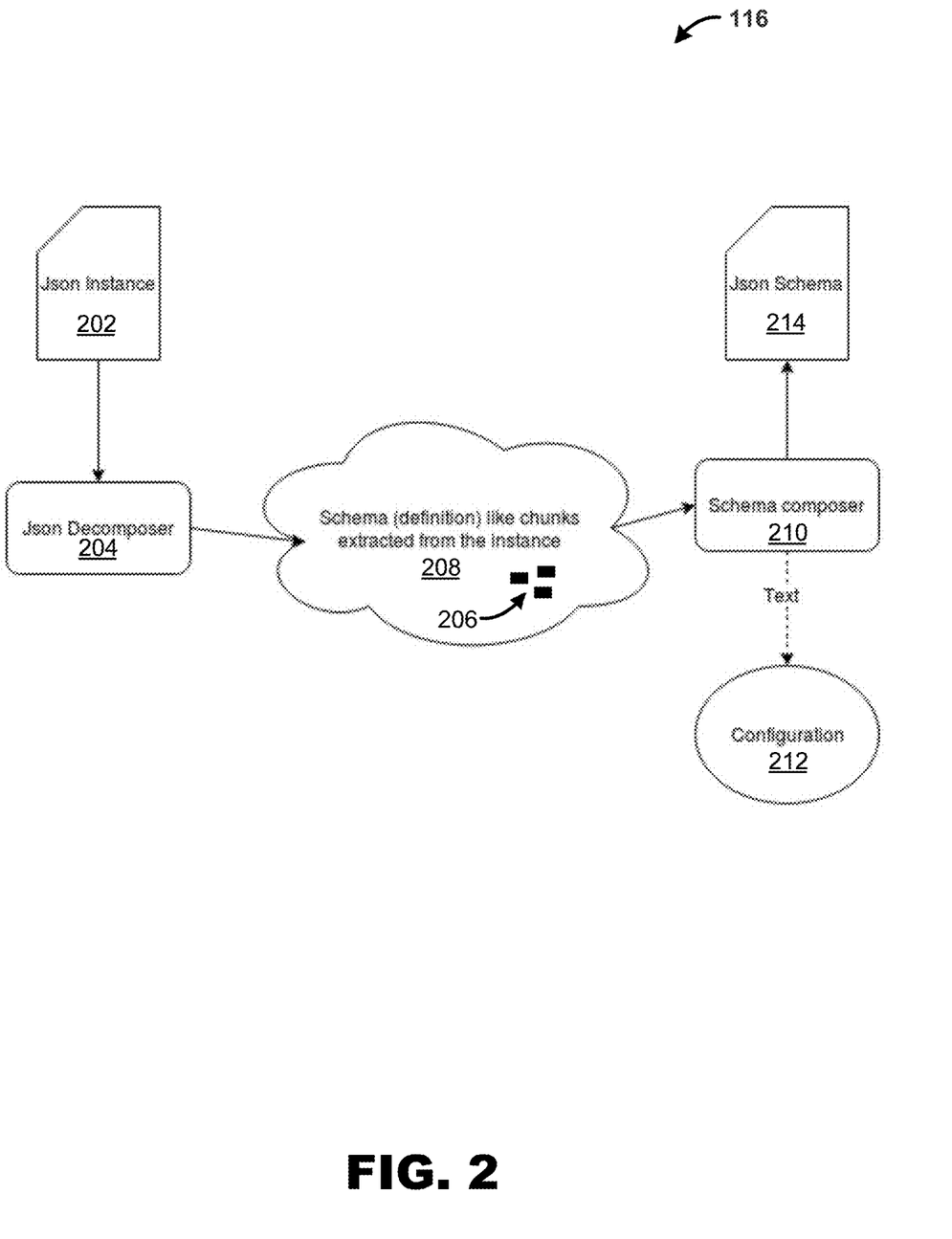
FIG. 2 illustrates one implementation of a user interface (UI) for generating schemas.

FIG. 2 is a high level functional diagram of schema processing engine 116 for generating a schema, such as JSON schema, to an output schema, such as an output JSON schema. In one implementation, schema processing engine 116 processes at least one base schema instance 202, e.g., base JSON schema, using a schema decomposer 204 (e.g. JSON decomposer). Schema decomposer 204 parses base schema instance 202 into sets of schema chunks 206, which are then stored as schema extraction output 208. Schema extraction output 208 may be stored in database 120 and/or in other types of storage such as Cloud based storage.

In other implementations, schema decomposer 204 receives and dissects one or more base schema instances 202 to generate schema chunks 206 associated with a plurality of schema contents, such as objects, arrays, and values of base schema instance 202. Upon dissection, schema chunks 206 may be configured as independent configurable schema chunks 206, which may be employed as combinable data objects that may be combined in any order to form a desired output schema 214. In some implementations, schema chunks are assembled according to an output schema configuration model derived at least in part from user configuration data and assembly order data stored in schema chunks 206.

When generated, at least some schema chunks 206 are configured with an internal reference, which may be used to identify individual schema chunks 206. In addition, schema chunks 206 may be configurable such that a user may configure some schema chunks 206 to be modified for a particular purpose, assembled in a particular order, establish an error threshold, and the like. For example, schema chunks 206 may be configured with user configuration information used to change types from one type definition to another, provide assembly information for generating output schema 214, provide error threshold data, and the like.

In exemplary implementations, schema composer 210 receives one or more sets of schema chunks 206 as schema extraction output 208, and schema configuration data 212, to generate schema final output 214 (e.g., JSON Schema). In one implementation, schema composer 210 receives schema configuration data 212 as configuration objects received from a user inputting such configuration objects into for example, a configuration interface associated with user input 114. For example, a user may input a metadata file containing configuration objects and information.

In other implementations, when arrays are used as an input, schema composer 210 may be configured to select a first array element as the array type, or may be configured to do a pseudo random sample of the input array to determine if types of data in the array vary. If the data types vary, schema composer 210 may perform actions such as providing a data type variance flag to prompt the user to define the array and/or data type, repair the array, establishing different array processing processes, etc.

Schema composer 210 processes schema extraction output 208, for example, by traversing a schema model generated from traversing nodes of base schema instance 202 to determine a schema structure and analyzing schema configuration data 212 to determine a structure and output schema configuration of output schema 214. Thus, using the information obtained by the nodal traversal and schema configuration data 212, schema composer 210 is configured to build one or more output schemas 214, such as a JSON schema, to a desired output schema configuration.

In one implementation, schema composer 210 operates in a "best effort" mode that allows the generation of, for example, base schema instance 202 to output schema 214, that ignores data, attributes, and variables that may not be necessary to produce the resulting output schema 214, or may produce an output schema 212 to an acceptable error threshold level. As such, by ignoring information that may be ignored such as non-relevant information, user defined ignorable information, and the like, schema composer 210 increases processor processing speed and efficiency to build the output schema 214. Thus, schema composer 210 may be configured to adjust the schema generation efficiency and/or tolerance based on schema configuration and error thresholds to solve references (e.g., resolve, correct, etc.), assign target names and relative routes, etc.

In other implementations, schema composer 210 may be configured to allow schema generation to be more or less tolerant of data pertaining to schema chunks 206 used to construct output schema 214 such as schema chunks 206, references, target names, relative routes, array value types, etc. For example, schema context may be set to be tolerant of text case variations, character string length, character types, symbols, etc.

Figure 3:
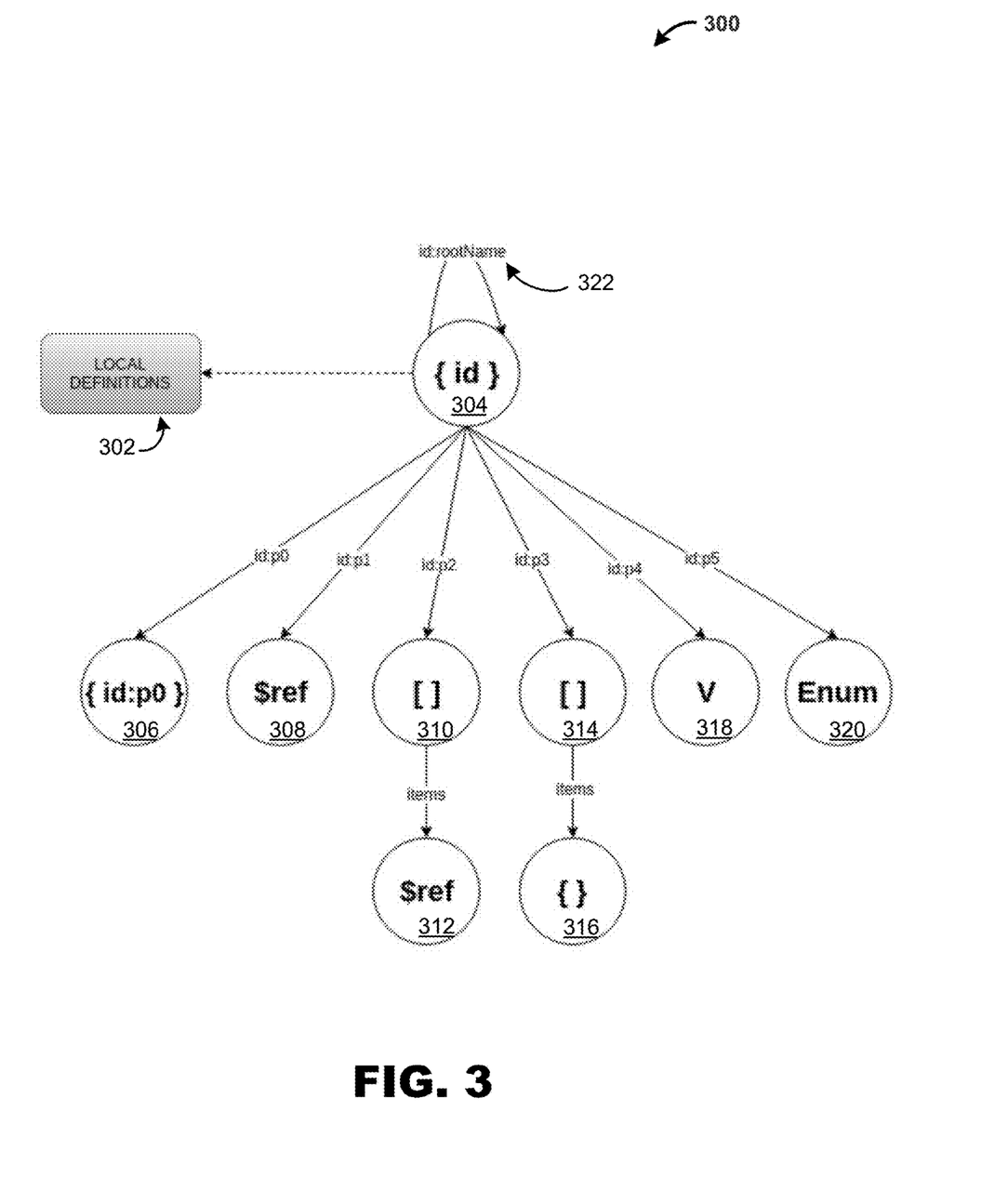
FIG. 3 illustrates a high-level hierarchy model of a Java representation of a JSON Schema.

FIG. 3 illustrates a high-level hierarchy model 300 of a Java representation of a JSON Schema 202. In one implementation, hierarchy model 300 is shared among utilities associated with schema generator 110. In some configurations, an observer, such as an observation daemon, allows listeners that are provided access to observe, such as registered listeners, to traverse hierarchy model 300.

Hierarchy model 300 may include a plurality of nodes, such as a base node 304 configured with a root name ID. In this example, hierarchy model 300 is shown as a JSON Schema (e.g., JSON schema Ver. 4) as a Java representation, JxModel. In other implementations, where the root object is the root of the composition, a virtual property arrow 322 may be used that loops over that root node 304 and whose name is formed by the root object Id and the name of hierarchy model 300 (e.g., "id:rootName").

In general, hierarchy model 300 (e.g., JxModel) may be composed of a plurality of nodes. In this example, hierarchy model 300 is composed of JSON schema nodes 304-320. To build hierarchy model 300, a context may be used which consist of key/value pairs, where the key is a unique string identifier and the value is a schema node, e.g., JSON schema node. In order to have a valid context, attributes, such as "$ref" as shown in node 308, may be used in nodes for mapping that contain a keyset of the mapping. In other implementations, object IDs are taken from their property arrows as shown for example in nodes 306, 308, 310, 314, 318, and 320 (e.g., {id:p0}). In addition, local definitions can be pointed to by local $refs retrieved from local definition source 302.

Figure 4:
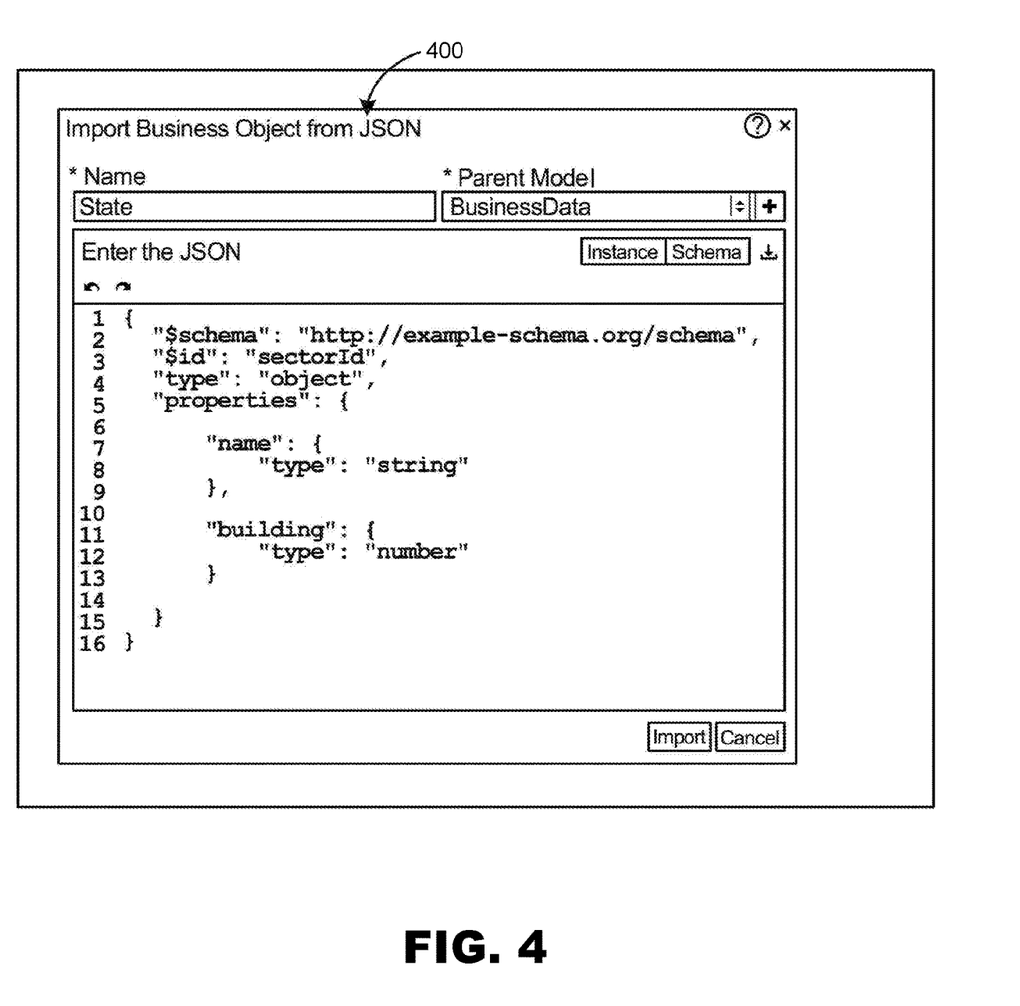
FIG. 4 is a high level illustration of a schema generator user interface.
Figure 5:
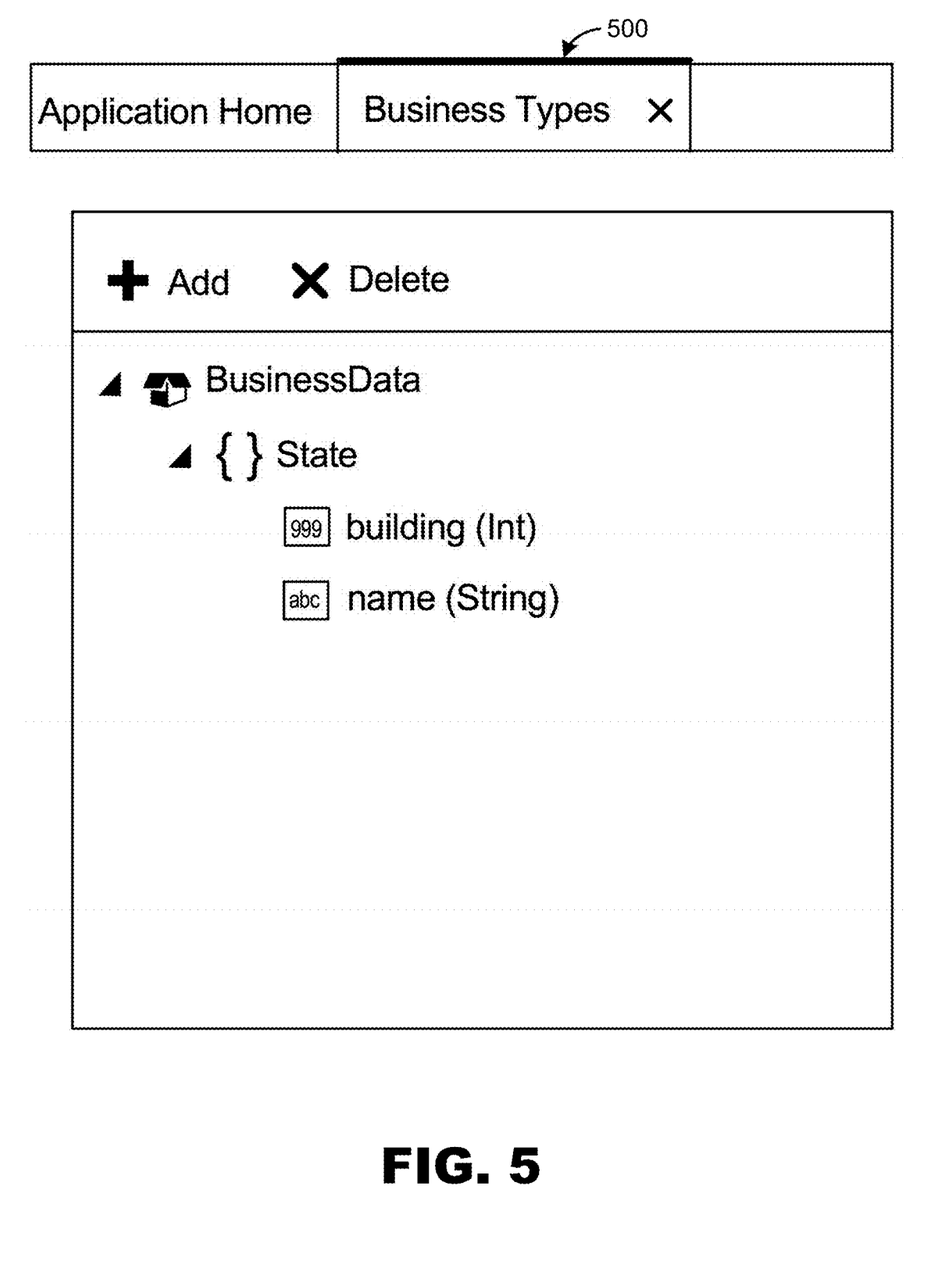
FIG. 5 is a high level illustration of a schema data import interface.

FIG. 4 is a high level illustration of a user interface 400 for schema processing engine 116. In this implementation, a file containing one or more base schema instances 202 is inputted into user interface 400 using, for example, business objects imported from a file via an import interface 500 as illustrated in FIG. 5. Using the process described herein with regard to schema processing engine 116, such imported base schema data is used to generate a target output schema 214, examples of which are illustrated in FIGS. 6 and 7A-7B described below.

Figure 6:
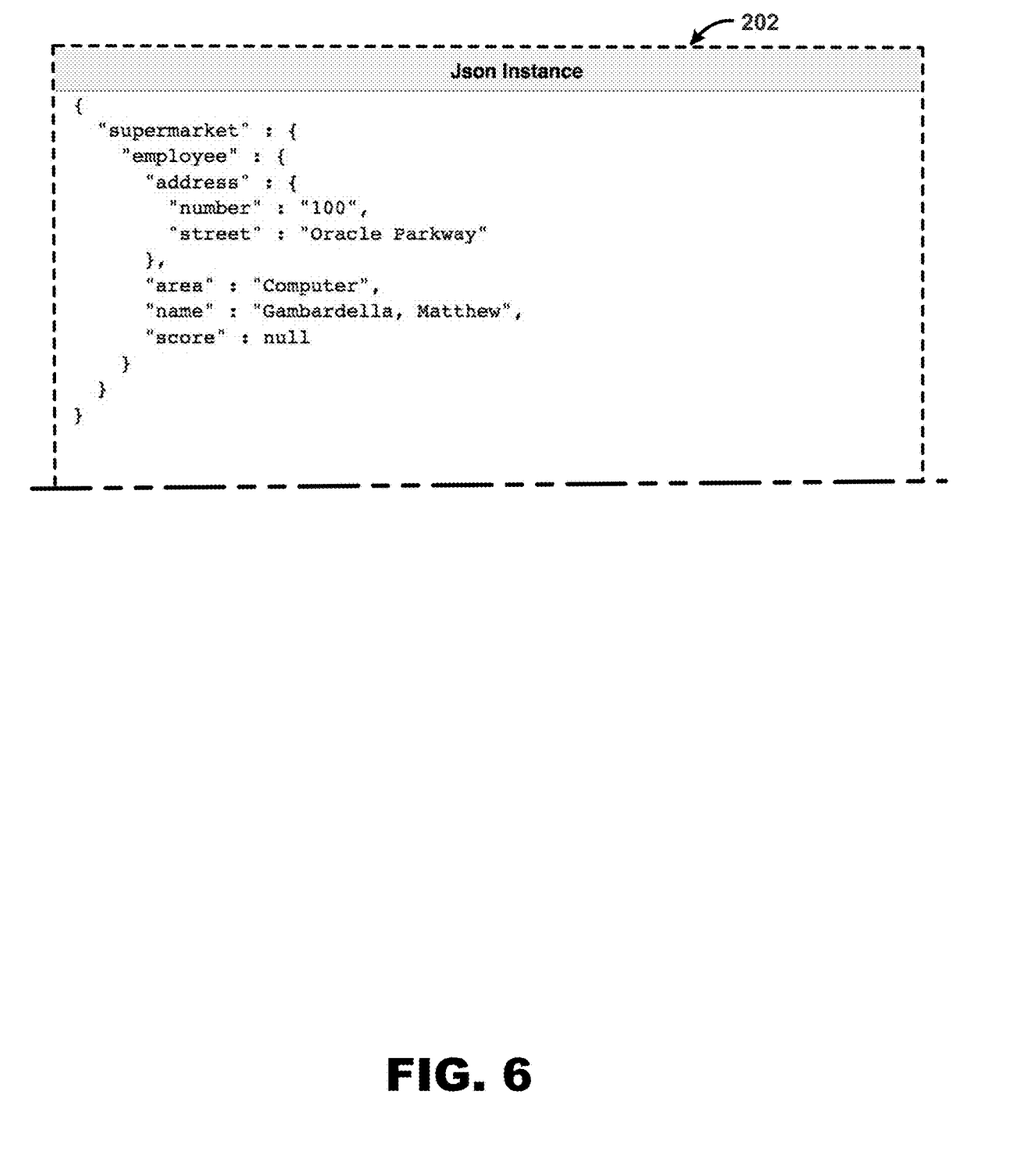
FIG. 6 is a high level illustration of an input base JSON schema instance.
Figure 7A:
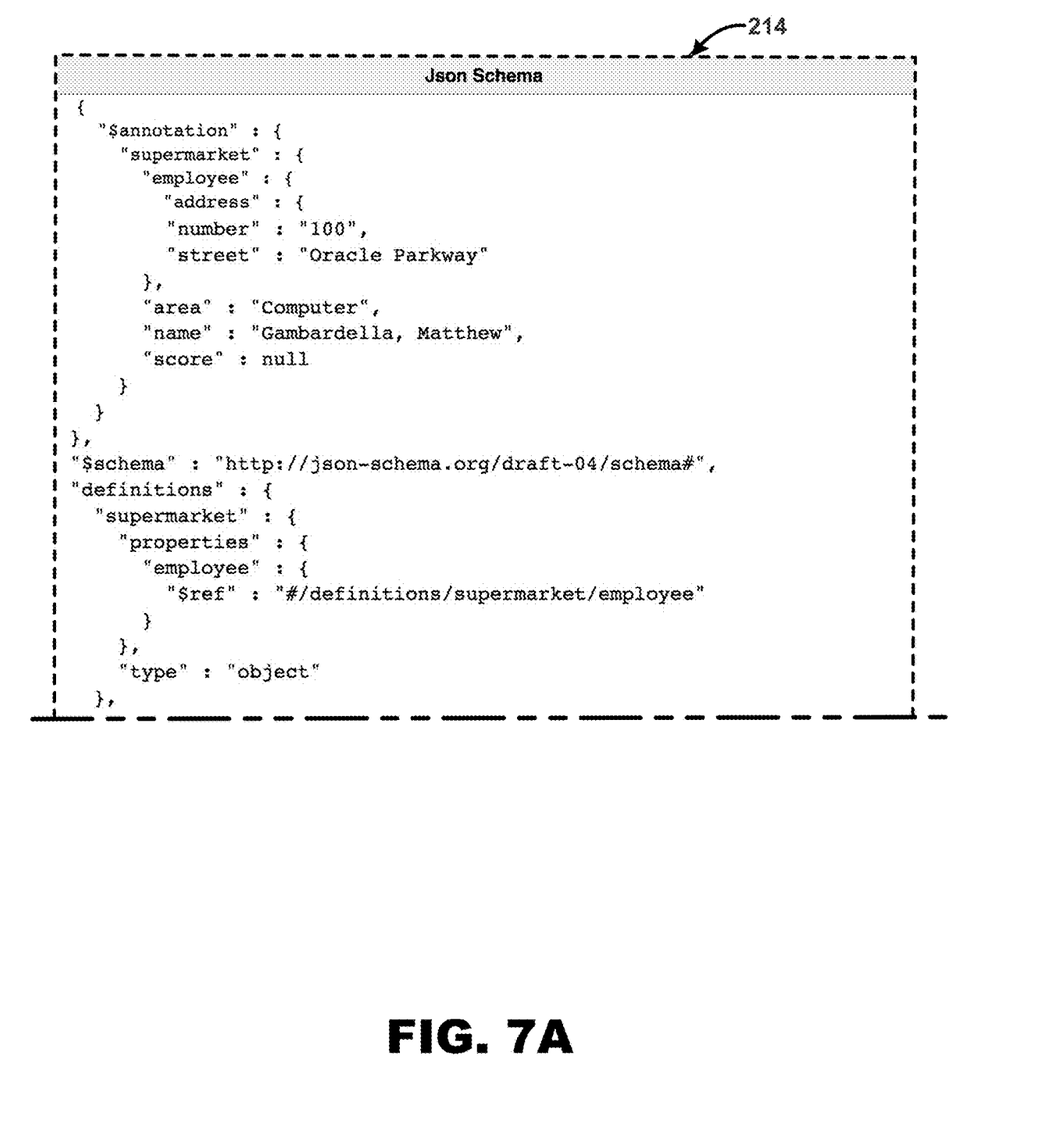
FIGS. 7A-7B is a high level illustration of an example JSON output schema using implementations described herein.
Figure 7B:
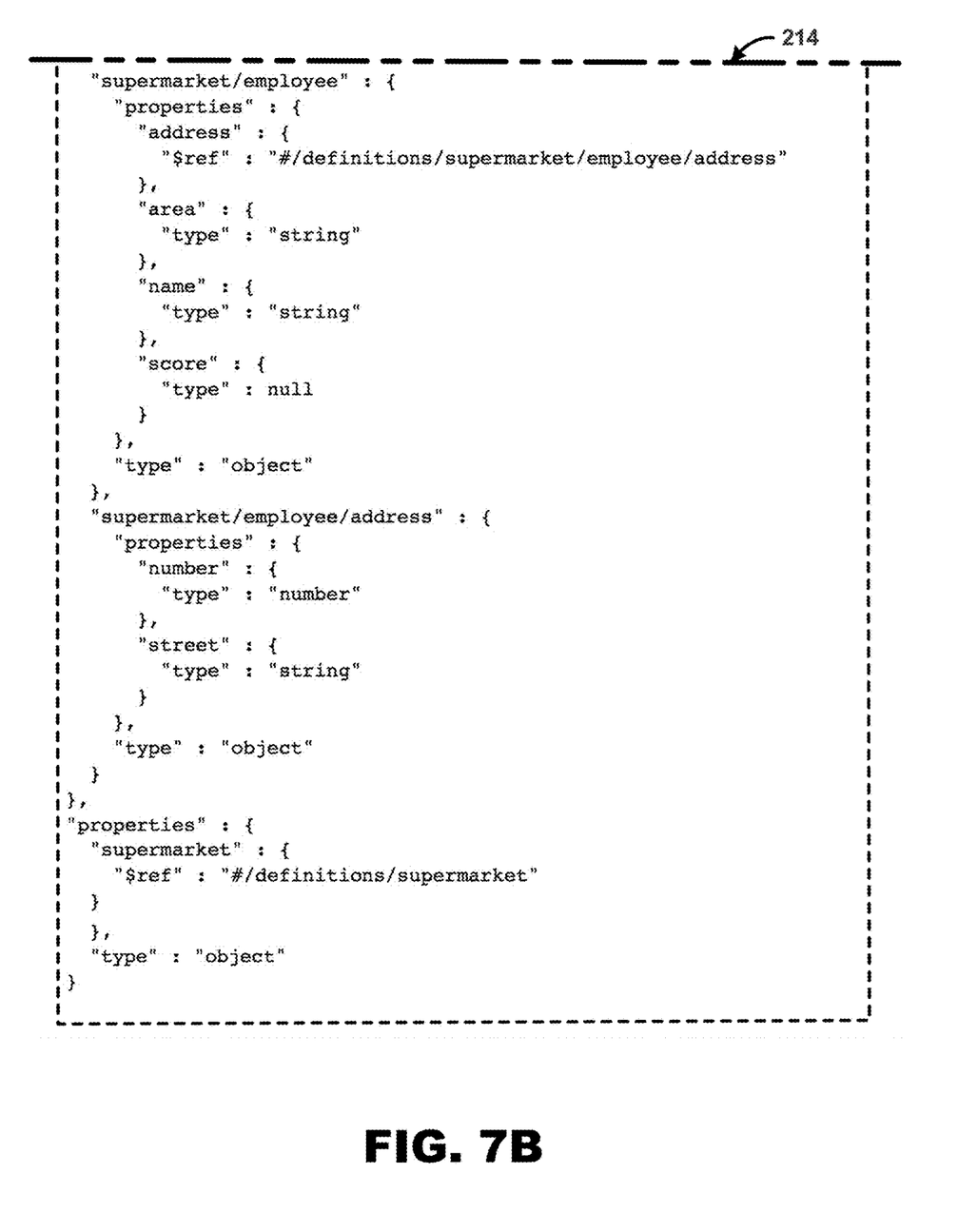

FIGS. 6 and 7A-7B are high level illustrations of an example base schema input instance 202 (e.g., JSON base schema), and resultant output schema 214. For example, FIG. 6 illustrates a base schema input 202, and FIGS. 7A-7B illustrate output schema 214, generated using implementations described herein to generate such output schema 214. In some implementations, a JSON schema standard from JSON-SCHEMA.ORG, may be used as schema data input however, other schema protocols, specifications, and the like, and variations thereof, may be used. Upon processing using error and context tolerance mechanisms described herein, FIGS. 7A and 7B illustrate the resulting example output schema 214.

Figure 8:
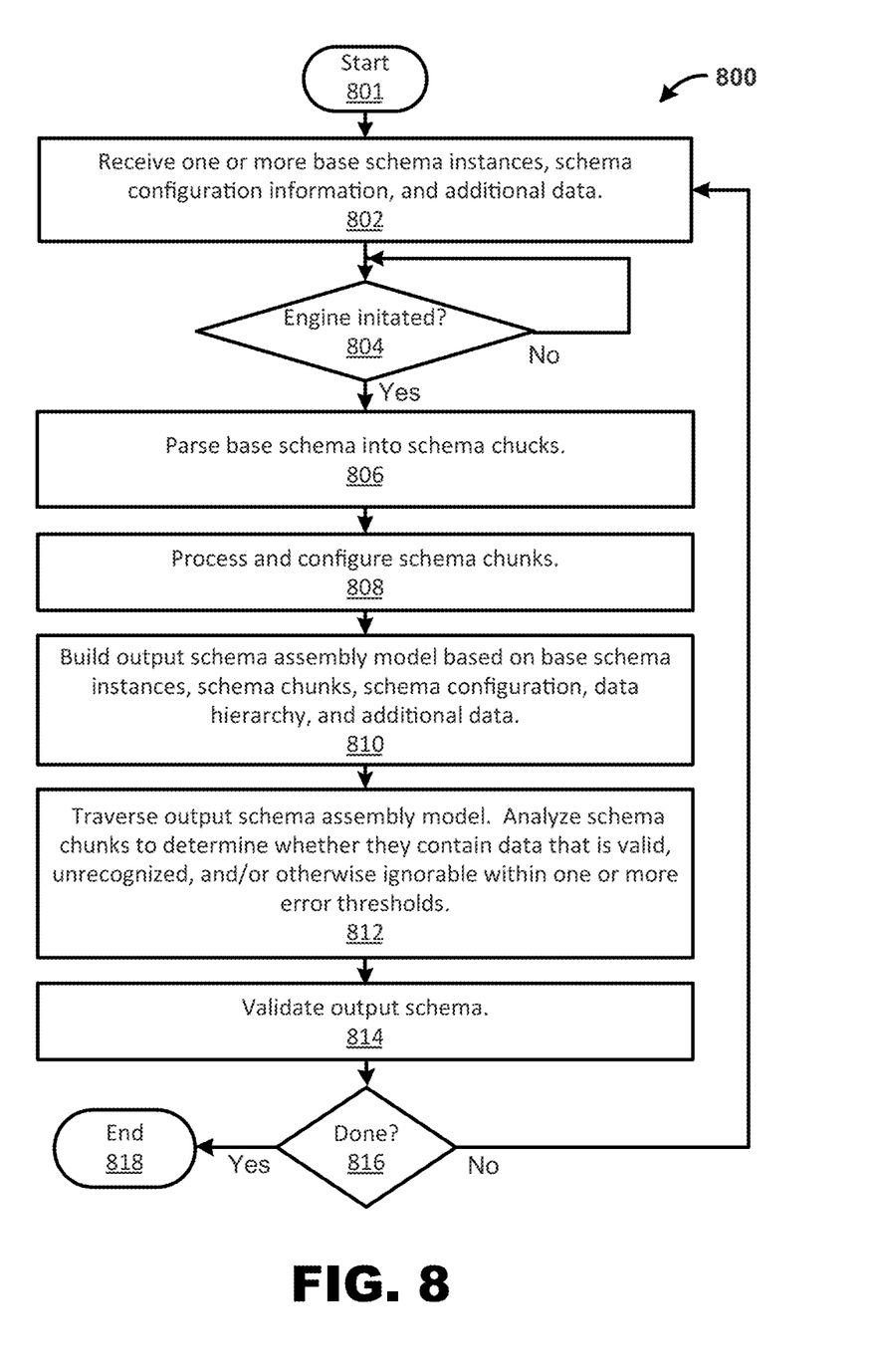
FIG. 8 is a flow diagram of an example method adapted for use with implementations, and variations thereof, illustrated in FIGS. 1-7.

FIG. 8 is a flow diagram of an example method 800 adapted for use with implementations, and variations thereof, illustrated in FIGS. 1-7. Method 800 may be entered into at 801 when, for example, schema generating system 110 is invoked.

At 802 one or more base schema instances 202, such as JSON base schema instance 202 (e.g., base JSON schema instance), are received to be processed. At 804, method 800 determines whether schema processing engine 116 has been initiated, for example, by a user invoking schema processing engine 116 from a terminal command line. If schema processing engine 116 has been initiated, then method 800 proceeds to 806. If not, method 800 returns to 804.

At 806, method 800 parses a base schema instance 202 into schema chucks 206. For example, method 800 may parse a JSON schema 202 into JSON schema chucks 206 connected through a data hierarchy using schema decomposer (e.g., JSON decomposer) 204. Method 800 may determine from, for example, information pertaining to schema chunks 206, an output schema assembly hierarchy model.

At 808, method 800 traverses nodes of the output schema assembly hierarchy model, processes, and configures schema chunks 206. In one implementation, configuration data 212 is used to configure one or more schema chunks 206 such that the resulting output schema 214 is configured to a user's desired output schema and assembled according to the output schema assembly hierarchy model.

At 810, method 800 builds an output schema 214 based on the output schema assembly hierarchy model, base schema instances 202, schema configuration data 212, and additional data.

At 812, method 800 traverses the output schema assembly hierarchy, analyzing nodes to determine whether the type of data objects is known, unknown, or flagged. If the type of data object is known, method 800 proceeds to traverse at least one leaf node of the branch defining a schema chunk 206. However, if the schema chunk 206, or data contained therein, is unknown, flagged to ignore, or otherwise deemed to be tolerable within one or more acceptable error thresholds, method 800 proceeds to another node of the output schema assembly hierarchy.

In some implementations, to allow for different levels of "best effort" error tolerance, one error threshold may be used to set one limit of error tolerance, a second error threshold level may be used to set another level of error tolerance, and so on. Advantageously, utilizing differing error threshold levels allows a user to tailor schema generation to meet a wide range of requirements and needs such as processing efficiency, speed, tolerance, flexibility, and the like.

At 814, method 800 validates the output schema 214. In one implementation, method 800 compares output schema 214 to base schema instance 202 to determine if there any differences outside the desired configuration. For example, method 800 may compare an output schema 214 where a user employed configurations data 212 to make some "batch transformations" during the generation of the output schema 214 mapping all numbers to the string type, or all "age" fields to an integer type to base schema instance 112 used to generate output schema 214. In this case, method 800 may ensure that the batch processing was done correctly by matching the numbers in the number field or "age" fields to the desired configuration.

At 816, if the schema generation process is done, method 800 proceeds to 818 and ends. However, if the schema generation process is not done, method 800 proceeds to 802.

Figure 9:
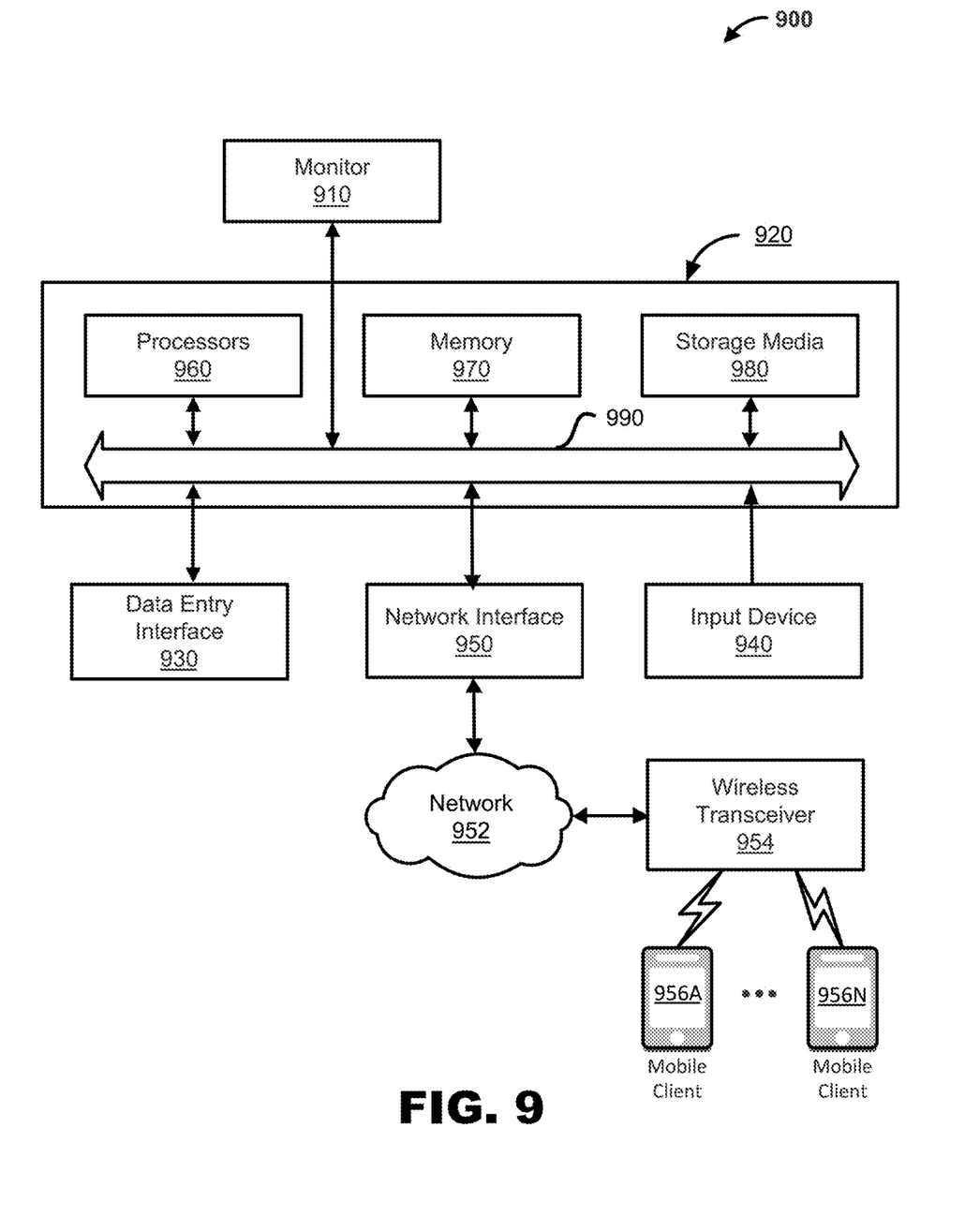
FIG. 9 is a high-level block diagram of an exemplary computer and communication system.

FIG. 9 is a block diagram of an exemplary computer system 900 for use with implementations described herein. Computer system 900 is merely illustrative and not intended to limit the scope of the claims. One of ordinary skill in the art would recognize other variations, modifications, and alternatives. For example, computer system 900 may be implemented in a distributed client-server configuration having one or more client devices in communication with one or more server systems.

In one exemplary implementation, computer system 900 includes a display device such as a monitor 910, computer 920, a data entry device 930 such as a keyboard, touch device, and the like, a user input device 940, a network communication interface 950, and the like. User input device 940 is typically embodied as a computer mouse, a trackball, a track pad, wireless remote, tablet, touch screen, and the like. Moreover, user input device 940 typically allows a user to select and operate objects, icons, text, characters, and the like that appear, for example, on the monitor 910.

Network interface 950 typically includes an Ethernet card, a modem (telephone, satellite, cable, ISDN), (asynchronous) digital subscriber line (DSL) unit, and the like. Further, network interface 950 may be physically integrated on the motherboard of computer 920, may be a software program, such as soft DSL, or the like.

Computer system 900 may also include software that enables communications over communication network 952 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like. Communication network 952 may include a local area network, a wide area network, a wireless network, an Intranet, the Internet, a private network, a public network, a switched network, or any other suitable communication network, such as for example Cloud networks. Communication network 952 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 952 may communicate to one or more mobile wireless devices 956A-N, such as mobile phones, tablets, and the like, via a base station such as wireless transceiver 954.

Computer 920 typically includes familiar computer components such as a processor 960, and memory storage devices, such as a memory 970, e.g., random access memory (RAM), storage media 980, and system bus 990 interconnecting the above components. In one embodiment, computer 920 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 970 and Storage media 980 are examples of tangible non-transitory computer readable media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory computer readable medium including one or more instructions executable by one or more processors for:

receiving a base schema instance;

parsing the base schema instance into a plurality of configurable schema chunks;

configuring at least one of the plurality of configurable schema chunks according to user configuration input;

processing the base schema instance, a set of the plurality of configurable schema chunks, and the user configuration input to generate a model of an output schema configuration which includes nodes representing the configurable schema chunks;

traversing nodes of the model of the output schema configuration according to one or more input parameters to determine schema assembly hierarchy, wherein the one or more input parameters include respective error thresholds for each of two or more types of errors including a first type of error that is a benign error that does not cause failure of an output schema when implemented without resolution and a second type of error that causes failure of the output schema when implemented without resolution, wherein the respective error thresholds include at least a first error threshold for a first level of error tolerance and a second error threshold for another level of error tolerance, based on a target efficiency, speed, or flexibility;

assembling the set of the configurable schema chunks according to schema assembly hierarchy into the output schema;

recursively analyzing the output schema to determine if the output schema contains one or more errors that exceed the respective error thresholds; and recursively resolving the one or more errors determined by the recursive analysis, to fall below the respective error thresholds and to generate a target schema.

2. The computer readable medium of claim 1, wherein parsing comprises dissecting the base schema instance to transform at least one of objects, arrays, or values of the base schema instance into at least some of the configurable schema chunks.

3. The computer readable medium of claim 1, wherein configuring comprises modifying a value type of the at least one of the plurality of configurable schema chunks from a first value type to a second value type, wherein the first value type of a corresponding data object of the base schema instance associated with the at least one of the plurality of configurable schema chunks is different than the second value type of the corresponding data object of the output schema associated with the at least one of the plurality of configurable schema chunks.

4. The computer readable medium of claim 1, wherein analyzing the base schema instance and the configurable schema chunks comprises analyzing at least some of the configurable schema chunks to determine the output schema configuration.

5. The computer readable medium of claim 1, further comprising employing the base schema instance to validate the output schema.

6. The computer readable medium of claim 5, wherein the base schema instance and output schema comprise a JSON schema.

7. A computer implemented method, comprising:
receiving a base schema instance;
parsing the base schema instance into a plurality of configurable schema chunks;
configuring at least one of the plurality of the configurable schema chunks according to user configuration input;
processing the base schema instance, a set of the plurality of configurable schema chunks, and the user configuration input to generate a model of an output schema configuration which includes nodes representing the configurable schema chunks;
traversing nodes of the model of the output schema configuration according to one or more input parameters to determine schema assembly hierarchy, wherein the one or more input parameters include respective error thresholds for each of two or more types of errors including a first type of error that is a benign error that does not cause failure of an output schema when implemented without resolution and a second type of error that causes failure of the output schema when implemented without resolution, wherein the respective error thresholds include at least a first error threshold for a first level of error tolerance and a second error threshold for another level of error tolerance, based on a target efficiency, speed, or flexibility;
assembling the set of the configurable schema chunks according to schema assembly hierarchy into the output schema; and
recursively analyzing the output schema to determine if the output schema contains one or more particular types of error that exceed the respective error thresholds; and
recursively resolving the one or more errors determined by the recursive analysis, to fall below the respective error thresholds and to generate a target schema.

8. The method of claim 7, wherein parsing comprises dissecting the base schema instance to transform at least one or objects, arrays, or values of the base schema instance into at least some of the configurable schema chunks.

9. The method of claim 7, wherein configuring comprises modifying a value type of the at least one of the plurality of configurable schema chunks from a first value type to a second value type, wherein the first value type of a corresponding data object of the base schema instance associated with the at least one of the plurality of configurable schema chunks is different than the second value type of the corresponding data object of the output schema associated with the at least one of the plurality of configurable schema chunks.

10. The method of claim 7, wherein analyzing the base schema instance and the configurable schema chunks comprises analyzing at least some of the configurable schema chunks to determine the output schema configuration.

11. The method of claim 7, further comprising the step of employing the base schema instance to validate the output schema.

12. The method of claim 7, wherein the base schema instance and output schema comprise a JSON schema.

13. An apparatus for generating schemas in a computing environment, the computing environment comprising one or more computing devices in communication with a schema generation utility that executes software configured to generate schemas accessible to the one or more computing devices, a computing device of the one or more computing devices configured to:
receive a base schema instance;
parse the base schema instance into a plurality of configurable schema chunks;
configure at least one of the plurality of configurable schema chunks according to user configuration input;
process the base schema instance, a set of the plurality of configurable schema chunks, and the user configuration input to generate a model of an output schema configuration which includes nodes representing the configurable schema chunks;
traverse nodes of the model of the output schema configuration according to one or more input parameters to determine schema assembly hierarchy, wherein the one or more input parameters include respective error thresholds for each of two or more types of errors including a first type of error that is a benign error that does not cause failure of an output schema when implemented without resolution and a second type of error that causes failure of the output schema when implemented without resolution, wherein the respective error thresholds include at least a first error threshold for a first level of error tolerance and a second error threshold for another level of error tolerance, based on a target efficiency, speed, or flexibility;
assemble the set of the configurable schema chunks according to schema assembly hierarchy into the output schema; and
recursively analyzing the output schema to determine if the output schema contains one or more particular types of error that exceed the respective error thresholds; and
recursively resolving the one or more errors determined by the recursive analysis, to fall below the respective error thresholds and to generate a target schema.

\* \* \* \* \*

UNITED STATES PATENT AND TRADEMARK OFFICE
CERTIFICATE OF CORRECTION

PATENT NO. : 11,269,821 B2
APPLICATION NO. : 15/945109
DATED : March 8, 2022
INVENTOR(S) : Capillo Carril Page 1 of 1

It is certified that error appears in the above-identified patent and that said Letters Patent is hereby corrected as shown below:

In the Drawings

On sheet 9 of 10, in FIG. 8, and on the title page, the illustrative figure, under Reference Numeral 806, Line 1, delete "chucks." and insert -- chunks. --, therefor.

In the Specification

In Column 1, Line 32, delete "as there" and insert -- as the --, therefor.

In Column 7, Line 32, delete "chucks" and insert -- chunks --, therefor.

In Column 7, Line 33, delete "chucks" and insert -- chunks --, therefor.

In the Claims

In Column 11, Line 61, in Claim 8, delete "or objects," and insert -- of objects, --, therefor.

Signed and Sealed this
Ninth Day of August, 2022

Katherine Kelly Vidal
*Director of the United States Patent and Trademark Office*